March 8, 1927.
L. L. BEISE ET AL
1,620,510
CULTIVATOR FOR ELIMINATING QUACK GRASS
Filed Oct. 19, 1922
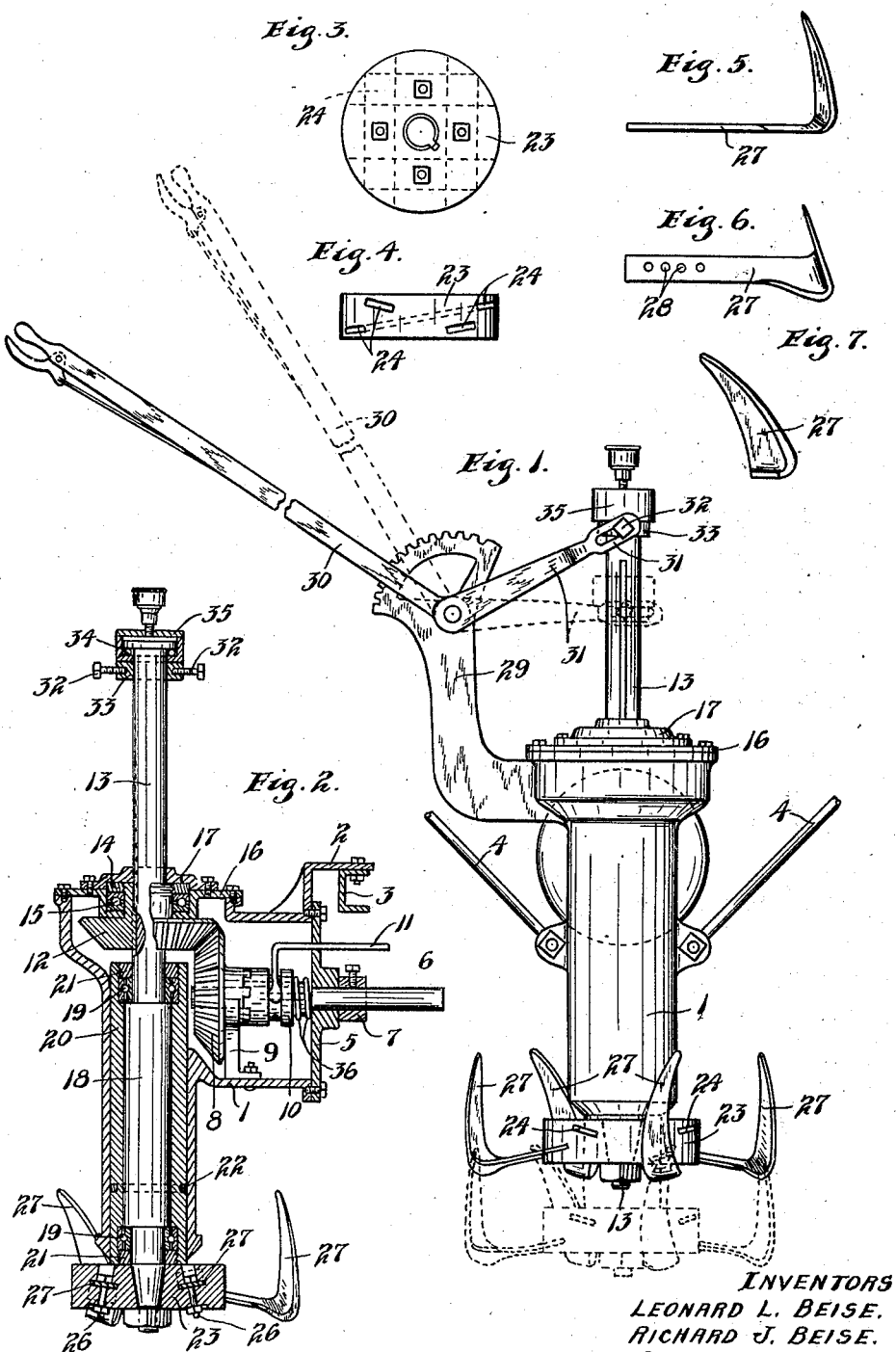
INVENTORS
LEONARD L. BEISE.
RICHARD J. BEISE.
BY THEIR ATTORNEY
James F. Williamson Patented Mar. 8, 1927.

1,620,510

UNITED STATES PATENT OFFICE.

LEONARD L. BEISE AND RICHARD J. BEISE, OF PINE ISLAND, MINNESOTA.

CULTIVATOR FOR ELIMINATING QUACK GRASS.

Application filed October 19, 1922. Serial No. 595,556.

This invention relates to a cultivator and particularly to a cultivator for thoroughly cutting up the soil to destroy quack or other grass growing therein. Quack grass has become quite a nuisance and menace in the western and northwestern part of the United States and much effort has been expended on methods and means for eradicating the same. It has been found that by thoroughly cultivating the soil for a comparatively shallow depth to cut the plants off and into pieces so that the sun can burn and dry the cut plants, that the grass can be effectively destroyed. Ground so treated is then planted in check corn, buckwheat, millet or hemp, which crops are effective to smother out any quack grass which may not have been destroyed.

It is an object of this invention to provide a cultivator which will thoroughly and efficiently cultivate the soil and tear up and cut to pieces the quack grass sod so that the same can be exposed to the sun and will be effectively destroyed.

It is a further object of the invention to provide such a device adapted for attachment to a tractor and comprising a head rotating on a vertical axis from which project a plurality of downwardly and outwardly directed hook-shaped blades.

It is also an object of the invention to provide a device with simple and efficient means for driving the rotating head and for raising and lowering the same.

These and other objects and advantages of the invention will be fully set forth in the following description made in connection with the accompanying drawings, in which like reference characters refer to the same parts throughout the different views, and in which, Fig. 1 is a view in front elevation of the device;

Fig. 2 is a view in central vertical section thereof;

Figs. 3 and 4 are, respectively, a bottom plan view and a view in side elevation of the blade carrying head; and Figs. 5 to 7, are, respectively, views in side elevation, plan and end elevation of one of the cutting blades.

Referring to the drawings, the device is illustrated as comprising a main frame or housing member 1. This member is provided with a laterally extending flange 2 conveniently arranged to be bolted to a frame member 3 of a tractor. The device illustrated is particularly designed for attachment to the well known Fordson tractor, and in addition to the attaching flange 2, are used the laterally directed base rods 4 connected to lugs projecting from the housing 1 and which will be connected at their other ends to convenient points on the tractor frame, said rods extending forwardly and rearwardly of the tractor. The housing 1 has a rear plate 5 forming a cover therefor and also forming the bearing for a shaft 6, which shaft is adapted to receive a gear at its inner end which is, in turn, connected by other gears to the transmission of the tractor, the gear connections not being shown. A collar 7 abuts the plate 5 and is connected to shaft 6 by a set screw to hold the shaft in correct longitudinal position. The inner end of the shaft has journaled thereon, a beveled gear 8, said end of the shaft receiving a nut to hold said gear in place. Said gear 8 has a rearwardly projecting sleeve journaled in a cap bearing member 9, the rear end of said sleeve being provided with teeth to form a half clutch. A collar 10, also forming a half clutch to engage gear 8 is splined to the shaft 6 between the plate 5 and the gear 8 and is provided with the usual groove to receive a clutch fork member 11 projecting rearwardly through the plate 5 and formed at its outer end with means for connection to an operating rod which will be disposed in convenient position for manipulation by the driver of the tractor. A spring 36 disposed between the collar 10 and the plate 5 normally urges the clutch into engaging position to connect the gear 8 with the shaft 6, it being understood that the said collar 10 can be withdrawn by the member 11 and held out of engagement with the gear when it is not desired to drive the device. The gear 8 meshes with another beveled gear 12 secured to a vertically extending shaft 13. The gear 12 has a sleeve projecting upwardly from its rear side which receives a threaded colar 14 at its upper end and a ball bearing 15 is disposed between said collar and an inwardly directed flange on a cap member 16 of the housing 1. The cap member 16 receives a similar top cap 17 closely fitting the shaft 13 and also fitting over the washer 14. The shaft 13 has an enlarged portion 18 below the gear 12 forming shoulders at its top and bottom adjacent which ball bearings 19 seat, these bearings being held in position in a sleeve 20 surrounding the portion 18 of the shaft and extending above and below the same and having interiorly threaded end portions in which are screwed the collars 21 which retain the bearings 19 in place. The sleeve 20 substantially fits a bore through a depending portion of the housing 1 and is grooved to receive a felt washer 22 contacting with the side of said bore. The lower end of shaft 13 is tapered and has a reduced threaded extension, the tapered portion receiving a headed member 23 securely held in place by a nut screwed onto the reduced threaded end of the shaft.

The head 23 is provided with a plurality of alined slots 24 passing through the sides thereof, as illustrated in Figs. 3 and 4, and these slots are traversed by bolt holes receiving headed and nutted bolts 26, which pass through and hold firmly in position the bars 27 disposed in said slots. The bars 27 are provided with a plurality of holes 28 adapted to receive the bolts 26 so that the bars may be extended to different positions outwardly from said head. Said bars are provided with sharpened edges or blades at their outer end and for this purpose are somewhat widened, the outer ends of said bars being turned upwardly and directed slightly inwardly, the forward edge of this upturned portion and a considerable portion of the front edge of the bar, as shown in Figs. 5 and 6, being sharpened to form the cutting edge. The cutting blades are thus in the shape of downwardly directed hook members.

The housing 1 is provided with a laterally and upwardly extending arm 29 formed as a toothed quadrant at its upper end and a lever 30 is pivoted to the arm 29 concentrically with said quadrant, said lever being provided with the usual grip-operated pawl adapted to engage said quadrant to hold the lever in various adjusted positions. The inner end of the lever is forked and the arms thereof provided with slots 31 adapted to engage projecting headed screws 32 secured in a collar 33 surrounding the shaft 13 and forming the support for a ball bearing 34, which supports a flange formed on the upper end of said shaft 13. The said bearing is surrounded by a cap 35 carrying an oil cup adapted to lubricate said bearing.

When the device is attached to a tractor, as described, and the clutch member 10 engaged with the gear 8, the shaft 13 will be driven and will, in turn, drive the head 23 and the blades 27. These blades will, of course, be driven so that their cutting edges advance. When it is desired to place the cutters in operation in the ground, the lever 30 will be operated and the shaft 13, head 23 and cutters placed in the ground to the desired depth. The head end cutters will be rapidly driven and the ground will be thoroughly cultivated and broken up and the quack grass plants and roots will be also cut off and thrown and whipped out of the soil.

From the above description it is seen that applicants have provided a compact, efficient and simple device which will effectively cultivate the ground and destroy the quack grass and other objectionable plants. The device can be easily and quickly attached to a standard tractor and be operated therefrom. The machine has been thoroughly demonstrated in actual practice and has been quite a commercial success and is very efficient for the purpose intended.

It will, of course, be understood that various changes may be made in the form, details and arrangement of the parts without departing from the scope of applicants' invention, which, generally stated, consists in the matter shown and described and set forth in the appended claims.

What is claimed is:

1. A cultivating device for eliminating quack or other grass comprising, a member adapted to rotate about a vertical axis, and a plurality of radially extending blade members projecting therefrom, said members extending outwardly and downwardly from said rotating member and having sharpened portions at their outer ends bent to extend upwardly and slightly inwardly, said first mentioned member terminating above the lowest point of said blade members.

2. A quack grass cutting tool comprising a member rotatable about a vertical axis and a plurality of radially projecting blades having portions adjacent their outer ends projecting below the remainder of said blades and below the lower end of said member, said blades extending substantially vertically from said portions.

3. A member rotatable about a vertical axis, a plurality of circumferentially spaced blades extending outwardly and downwardly from the lower end of said member, said blades being bent to extend upwardly and slightly inwardly adjacent their outer ends, said blades being sharpened from a short distance inwardly of said bends, to their terminals, said blades having their widest portion at said bends and tapering to substantially a point at their terminals.

In testimony whereof we affix our signatures.

LEONARD L. BEISE.
RICHARD J. BEISE.